J. J. McGUCKIN.
BICYCLE CRANK.
APPLICATION FILED MAY 15, 1919.
1,337,765.
Patented Apr. 20, 1920.
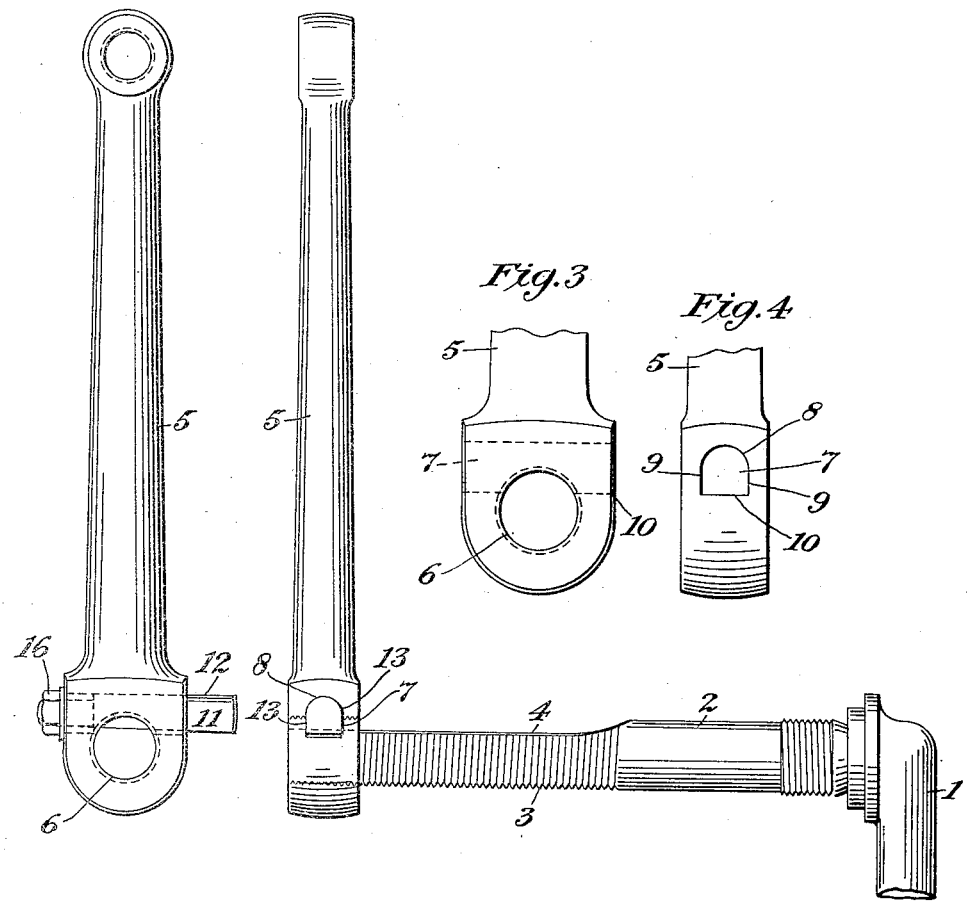
INVENTOR
John J. McGuckin.
BY
Andrew ____
ATTORNEY

UNITED STATES PATENT OFFICE.

JOHN J. McGUCKIN, OF BROOKLYN, NEW YORK, ASSIGNOR TO LOUIS SCHWAB, DOING BUSINESS AS STEVENS & COMPANY, OF NEW YORK, N. Y.

BICYCLE-CRANK.

1,337,765.  Specification of Letters Patent.  Patented Apr. 20, 1920.

Application filed May 15, 1919. Serial No. 297,386.

*To all whom it may concern:*

Be it known that I, JOHN J. McGUCKIN, a citizen of the United States, residing at No. 345 Avenue O, borough of Brooklyn, county of Kings, city and State of New York, have invented certain new and useful Improvements in Bicycle-Cranks, of which the following is a specification.

My invention relates to the crank-arms and drive-shafts which are commonly used in bicycles; and my invention is directed to certain novel and improved means whereby the crank-arm may be adjustably secured to the drive-shaft, in the way and to secure the advantages hereinafter pointed out and claimed.

In the art it has been customary to form a drive-shaft integral with one crank-arm and to secure the other crank-arm to the shaft by threading it thereupon and locking it in place by a transverse cotter pin engaging against the flattened face on the shaft. In common practice this cotter pin has been round; strain to which it is subjected in use has tended to indent or wear away the cylindrical surface of the cotter pin which is in contact with the flattened surface of the drive-shaft so that play takes place between the drive-shaft and the crank-arm.

It has also been suggested to use a rectangular cotter pin traveling through a rectangular hole. But that construction requires that the hole for the cotter pin in the crank-arm shall be cut with great care so that its top and sides shall be accurately trued and the top bearing between the cotter pin and the hole shall be so exact that the cotter pin while bearing smoothly against the bearing shall not bind when drawn home. In this latter construction, also, if there is any inequality or longitudinal slope in the flattened face on the shaft the rectangular form of cotter pin, traveling through the rectangular hole, will prevent an adjustment of its face contacting with the drive-shaft so as to lie evenly thereagainst; and, in consequence, but a portion of the flattened surface of the pin will engage against the flattened surface of the shaft and a firm and unyielding connection between the shaft and the crank arm will not be obtained.

The formation, also, of a smoothly dressed rectangular hole for the cotter pin presents, in practice, mechanical difficulties which add greatly to the cost of production. And, furthermore, such a rectangular hole tends to weaken the crank-arm by removing metal from it at one of the points where it is most needed. By my improvements I secure the advantages of using a flat face upon the cotter pin to engage with the flat face on the drive shaft, while the cotter pin is made self-seating in its bearing in the crank arm, so as to accommodate itself evenly against the bearing surface on the drive-shaft, and the crank-arm is not unduly weakened by the cutting away of the metal. The making of the hole in the crank-arm to receive the cotter pin, also, presents no expensive or complicated mechanical problems.

In the drawings Figure 1 is a side view of a drive shaft with one integral crank-arm, partly broken off, the other crank arm being attached by my improved means; Fig. 2, is a side view of the same omitting the integral crank arm; Figs. 3 and 4 are, respectively, a side view and an edge view, on an enlarged scale, of the end of the detachable crank-arm; Fig. 5 is a side view and Fig. 6 an end view of the cotter pin.

Similar parts are designated by the same reference numerals in all the figures.

The crank-arm 1 is formed integral with the drive-shaft 2 which is provided with a thread 3 and with a flattened side 4, as is usual in the art. The crank-arm 5 has a threaded hole 6 adapted to receive the threaded end of the drive-shaft 2. The crank-arm 5 is provided with a transverse hole 7 which is semicircular in its upper portion 8, its sides 9 being straight, while its bottom 10 is substantially flat in cross section.

This form of hole can be produced in practice by drilling a round hole through the hanger and then roaching out its bottom. And, inasmuch as the cotter pin does not contact with the bottom 10 of the hole 7, it is unnecessary to finish the bottom 10 with care, all that is necessary being to have a clearance between the cotter pin and the bottom of the hole when the cotter pin is drawn home against the shaft 2.

The cotter pin 11 has a semicylindrical top 12, vertical sides 13, 13 and a flattened bottom 14 and a reduced threaded end 15 adapted to receive the nut 16 to draw the cotter pin home through the crank arm.

In practice it is desirable to allow sufficient play between the sides 9, 9 of the hole 7 and the sides 13, 13 of the cotter pin 11, to allow the semicylindrical top 12 of the cotter pin to adjust itself in the semicylindrical seat 8 of the hole 7 so as to adjust its face 14 evenly to any inequality of slope of the flattened side 4 of the shaft 2.

It will be seen, therefore, that when the crank arm 5 is screwed upon the end of the shaft 2, and the cotter pin 11 is slipped into its seat in the hole 7 and drawn home by the nut 16, the cotter pin will adjust itself in its seat so as to bear evenly and uniformly with its rounded side against the rounded bearing through the arm 5, while with its broad flattened side it will bear against the flattened side of the shaft 2 so as to effectually lock the crank arm and shaft together, the contacting surfaces of the cotter pin and the shaft being sufficiently broad to eliminate danger of indentation or abrasion which would permit play between the parts.

Having thus described my invention, what I claim and desire to secure by Letters Patent of the United States is:

The combination, in bicycle driving mechanism, of a drive-shaft having a threaded end flattened on one side, a crank-arm having a threaded aperture to receive the threaded end of the shaft and being provided with a transverse cotter pin seat having a semicylindrical top, flattened sides and a depth greater than the greatest diameter of the hereinafter mentioned cotter pin and extending below the flattened face of the drive-shaft when the crank-arm and drive-shaft are assembled, a cotter pin having a cylindrical top, opposed flattened sides and a flat bottom and being of substantially less thickness than the width of the cotter pin seat, and means for drawing the cotter pin home through the seat in the crank-arm.

JOHN J. McGUCKIN.